United States Patent
Zhang et al.

(10) Patent No.: US 11,037,331 B1
(45) Date of Patent: Jun. 15, 2021

(54) METHOD FOR DE-CONTOURING AN IMAGE

(71) Applicant: NOVATEK MICROELECTRONICS CORP., Hsinchu County (TW)

(72) Inventors: Cong Zhang, Xi'an (CN); Jian-Hua Liang, Xi'an (CN); Yuan-Jia Du, Jinan (CN)

(73) Assignee: NOVATEK MICROELECTRONICS CORP., Hsinchu Science Park (TW)

( * ) Notice: Subject to any disclaimer, the term of this patent is extended or adjusted under 35 U.S.C. 154(b) by 29 days.

(21) Appl. No.: 16/748,461

(22) Filed: Jan. 21, 2020

(51) Int. Cl.
*G06K 9/46* (2006.01)
*G06T 9/20* (2006.01)

(52) U.S. Cl.
CPC .................................. *G06T 9/20* (2013.01)

(58) Field of Classification Search
CPC ........................ G06T 5/00; G06T 5/006; G06T 2207/20172; G06T 2207/20192; G06T 7/564; G06T 9/20
See application file for complete search history.

(56) References Cited

U.S. PATENT DOCUMENTS

| 9,589,324 B1 * | 3/2017 | Liu ........................ G06T 3/4076 |
| 2010/0135588 A1 * | 6/2010 | Au ......................... G06T 3/403 382/243 |

* cited by examiner

*Primary Examiner* — Duy M Dang
(74) *Attorney, Agent, or Firm* — Hamre, Schumann, Mueller & Larson, P.C.

(57) ABSTRACT

A method for de-contouring a source image is provided. In the method, a reference image is obtained based on the source image. Multi-oriented gradient calculation is performed on each pixel of the reference image, so as to obtain, for each pixel of the reference image, multiple gradient features that respectively correspond to multiple directions. For each pixel of the reference image, a monotonicity index is determined based on the corresponding gradient features. Then, a detail-protecting and de-contour operation is performed on the source image based on the monotonicity indices determined for the pixels of the reference image.

7 Claims, 6 Drawing Sheets

METHOD FOR DE-CONTOURING AN IMAGE

FIELD

The disclosure relates to image analysis, and more particularly to a method for de-contouring an image.

BACKGROUND

When an image including a pattern of color gradients is modified in a manner of, for example, bit reduction (e.g., a bit depth is changed from 8 bits to 6 bits), compression, etc., unwanted contours may appear in the pattern, creating unsmooth visual transitions of color, as shown in FIG. 1.

De-contour technologies were developed to solve this problem. Before performing a de-contour operation on an image, it is important to perform detail detection (i.e., to distinguish details from unwanted contours in the image), so as to preserve the desired details of the image during the de-contour operation.

In the past, detail detection is performed based on local features that are identified based on, for example, pixel gradient, pixel monotonicity, local dynamic range, local variance, etc. However, it is difficult for these methods to completely remove the unwanted contours without any loss of detail. It is difficult for these conventional methods to distinguish large-scale details, such as clouds, smoke, etc., from smooth contours because color change of a large-scale detail within a local area would be small. Furthermore, since a noisy unwanted contour may be similar to a small detail, the conventional methods may make incorrect judgment when distinguishing detail from unwanted contour. Accordingly, detail protection with respect to large-scale details and robustness to noise are challenges in detail detection in de-contour technologies.

SUMMARY

Therefore, an object of the disclosure is to provide a method that can alleviate at least one of the drawbacks of the prior art.

According to the disclosure, the method for de-contouring a source image is provided. The method includes: obtaining a reference image based on the source image, the reference image including a plurality of pixels that form a same image content as the source image; making each of the pixels of the reference image take turns in serving as a target pixel, and computing, for the target pixel, a number 2N of gradient features for a corresponding target area, which contains the target pixel, of the reference image, wherein: N is a positive integer greater than one; the gradient features respectively correspond to a number 2N of directions, and are classified into a number N of orthogonal feature groups each including two of the gradient features in such a way that, for each of the orthogonal feature groups, the directions that respectively correspond to the two gradient features of the orthogonal feature group are orthogonal to each other; and each of the gradient features is related to changes in the corresponding one of the directions in pixel data of those of the pixels located within the target area; determining a monotonicity index for the target pixel based on comparison between the two gradient features of each of the orthogonal feature groups; and performing a detail-protecting de-contour operation on the source image based on the monotonicity indices determined for the pixels of the reference image.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
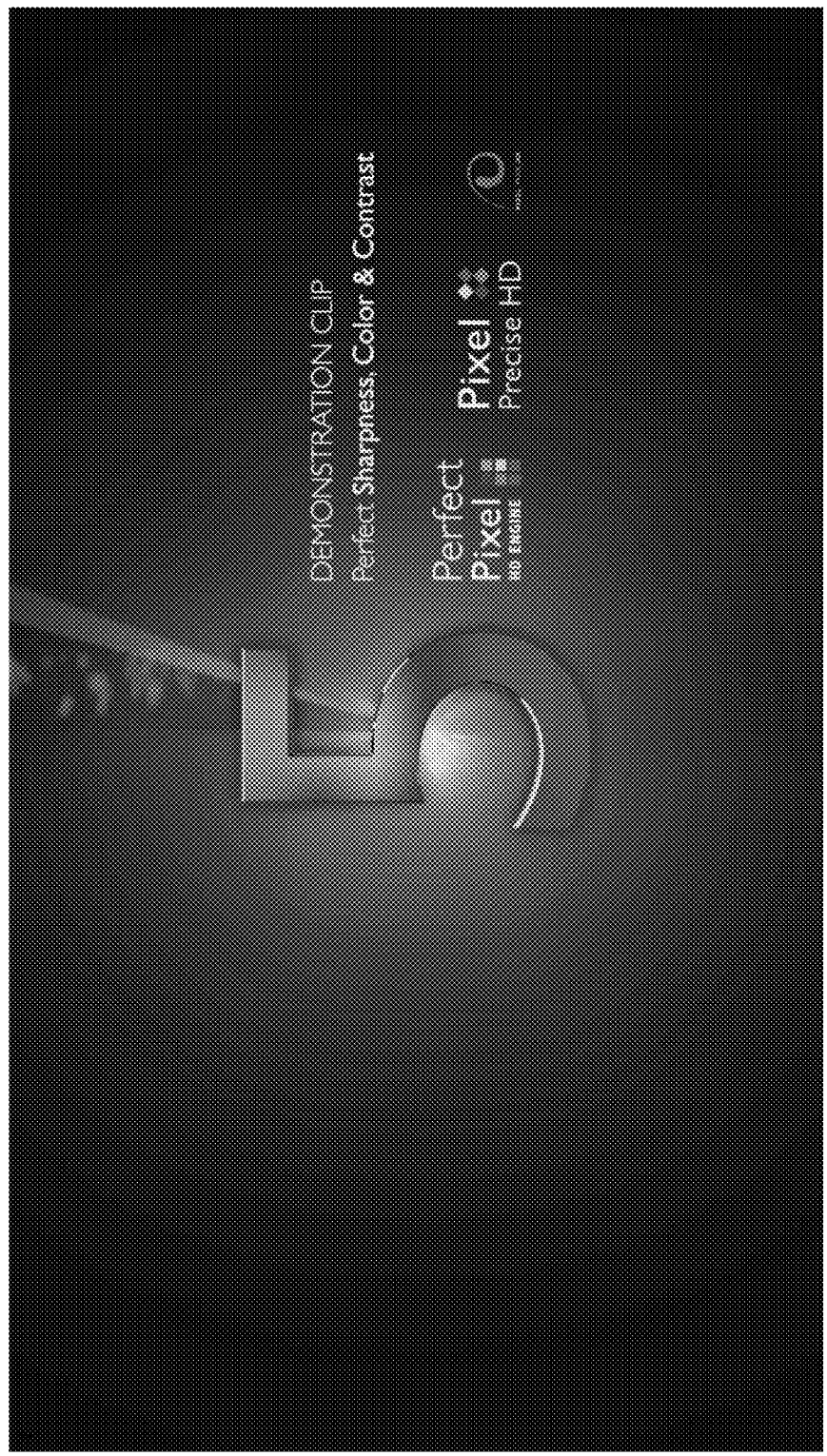
FIG. 1 is an image that includes many unwanted contours in regions with color gradients.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
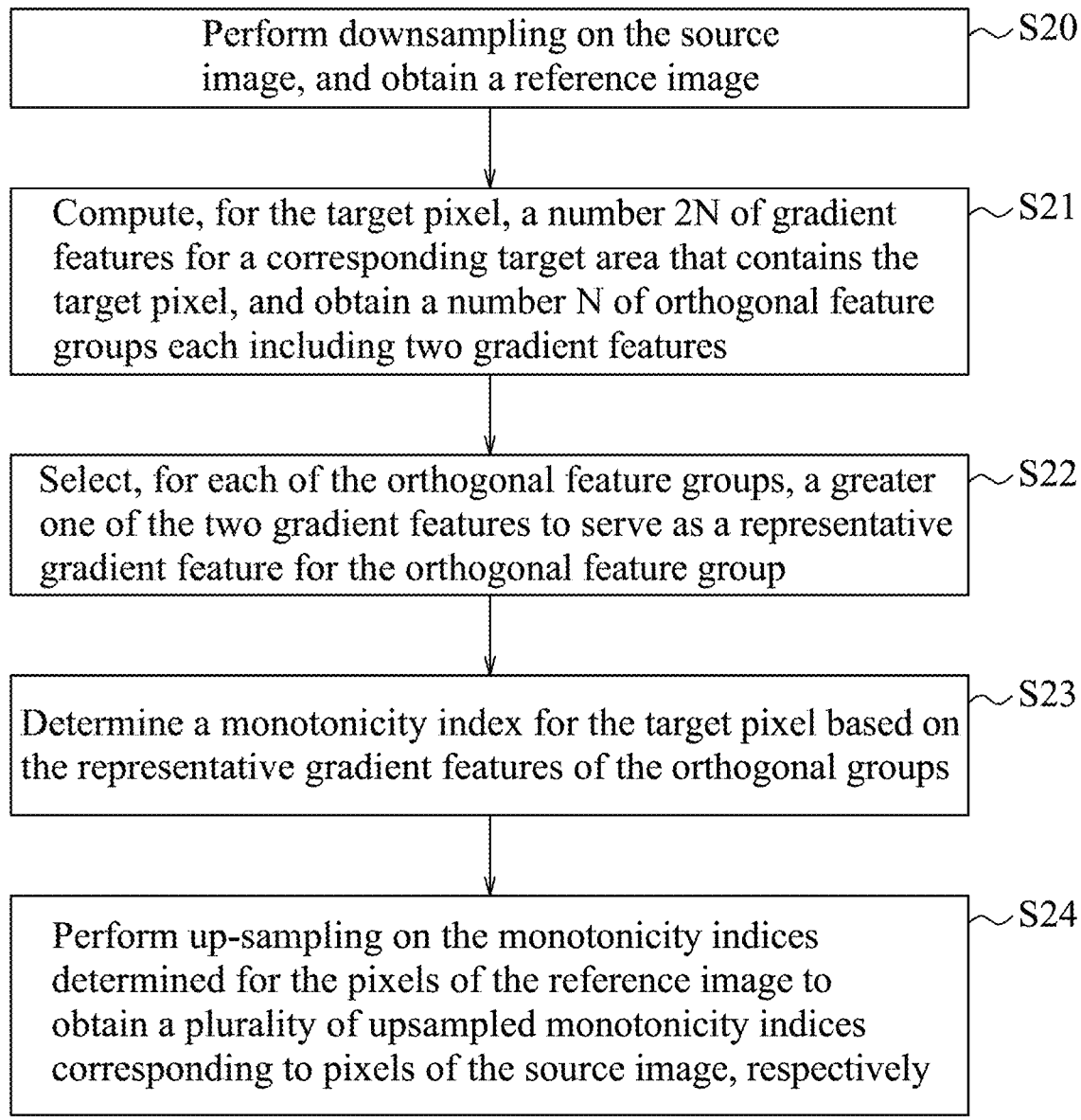
FIG. 2 is a flow chart illustrating steps of an embodiment of a method for de-contouring an image according to this disclosure.

Referring to FIG. 2, an embodiment of a method for de-contouring an image (referred to as a source image hereinafter) according to this disclosure is shown to include steps S20-S24. In practice, the embodiment may be implemented by program codes which, when executed by a processor, causes the processor to perform the embodiment, or the embodiment may be implemented by logic gates of a processor (e.g., a timing controller of a display panel), but this disclosure is not limited in this respect.

In step S20, the processor performs downsampling on the source image, and obtains a reference image. The reference image has a pixel resolution lower than that of the source image, and the pixels of the reference image depict the same image content as the source image. In other words, the source image is resized to a smaller size by the downsampling operation to create the reference image (e.g., downsampled from 1920×1080 pixels to 640×360 pixels). The downsampling operation may filter out noises on unwanted contours, preventing erroneously identifying the noisy unwanted contours as details. Furthermore, the downsampling operation allows representation of large-scale details using less pixels, so accuracy can be enhanced when detail detection is performed based on local features.

Steps S21-S23 illustrate monotonicity analysis performed by the processor on each of the pixels of the reference image. It is noted that the processor makes the pixels of the reference image take turns in serving as a target pixel, and for simplicity of explanation, steps S21-S23 will be described with respect to a same target pixel. In step S21, the processor computes, for the target pixel, a number 2N of gradient features for a corresponding target area of the reference image that contains the target pixel and that has a predefined size (e.g., defined by A×B pixels, where A and B are positive integers greater than one), where N is a positive integer greater than one. The 2N gradient features respectively correspond to a number 2N of directions (or orientations), and are classified into a number N of orthogonal feature groups each including two of the gradient features in such a way that, for each of the orthogonal feature groups, the directions that respectively correspond to the two gradient features in the orthogonal feature group are orthogonal to each other. Each of the gradient features is a value related to changes in the corresponding one of the directions in pixel data (e.g., grayscale codes) of those of the pixels located within the corresponding target area.

Figure 3:
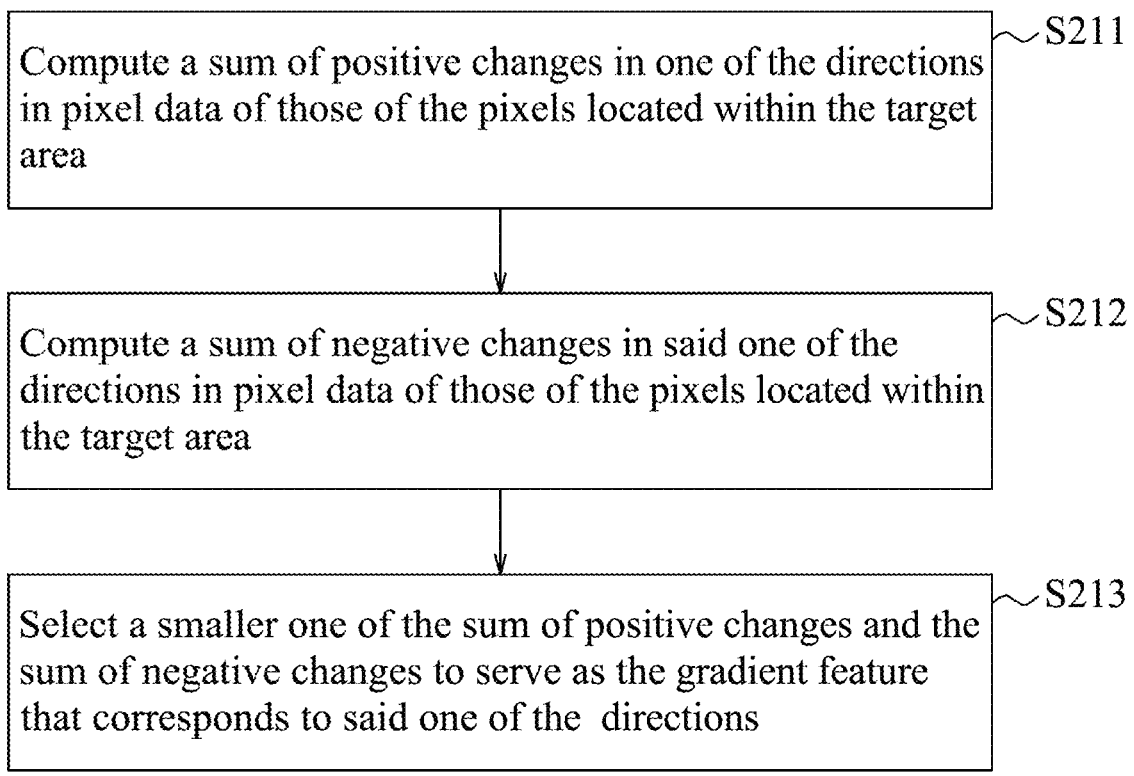
FIG. 3 is a flow chart illustrating details of step S21 in FIG. 2.

Referring to FIG. 3, steps S211-S213 describe how each of the gradient features is computed. In step S211, the processor computes a sum of positive changes in one of the directions in pixel data of those of the pixels located within the corresponding target area. In step S212, the processor computes a sum of negative changes in said one of the directions in pixel data of those of the pixels located within the corresponding target area. In step S213, the processor selects a smaller one of the sum of positive changes and the sum of negative changes to serve as the gradient feature that corresponds to said one of the directions since pixels changes would be less evident along the contours.

Then, the processor determines a likelihood level of the target pixel belonging to a detail in the image content based on comparison between the two gradient features of each of the orthogonal feature groups, as will be described in connection with steps S22 and S23 in FIG. 2.

In step S22, for each of the orthogonal feature groups, the processor selects a greater one of the two gradient features in the orthogonal feature group to serve as a representative gradient feature for the orthogonal feature group in order to find a contour that may have more details, which could result in a greater gradient feature. The representative gradient feature of the orthogonal feature group represents a likelihood of an unwanted contour appearing in the corresponding direction. The smaller the representative gradient feature, the greater the likelihood.

In step S23, the processor determines a monotonicity index for the target pixel based on the representative gradient features of the orthogonal feature groups. The monotonicity level represents the likelihood level of the target pixel belonging to a detail in the image content. To be specific, the smallest one of the representative gradient features of the orthogonal feature groups would serve as a monotonicity index that represents monotonicity of the target pixel. A greater monotonicity index signifies a higher likelihood for the target pixel to belong to a detail. In other words, the greater the monotonicity index corresponding to the target pixel is, the more likely the target pixel belongs to a detail.

In this embodiment, to compute a gradient feature with respect to the target pixel, for any two of the pixels that are located within the target area corresponding to the target pixel and that are adjacent to each other in the corresponding one of the directions, the processor calculates a change between the pixel data of the two pixels, so as to obtain, overall, a plurality of changes in pixel data for the target area. Subsequently, the processor sums up those of the changes which are positive to obtain a sum of positive changes, and sums up those of the changes which are negative to obtain a sum of negative changes.

Tables 1-1 to 1-5 provide a first example to illustrate how to determine a likelihood level of a target pixel belonging to a detail. Table 1-1 exemplarily lists grayscale codes (the pixel data in this example) of 5×5 pixels of a target area (i.e., the target area is an area of 5×5 pixels) with respect to a target pixel (e.g., a central pixel in the target area). The pixel data are arranged according to the locations of the pixels in the reference image. In this example, N is exemplified as two, so four gradient features would be computed.

TABLE 1-1

| 200 | 201 | 170 | 170 | 171 |
|---|---|---|---|---|
| 200 | 199 | 170 | 170 | 171 |
| 200 | 200 | 170 | 168 | 170 |
| 200 | 197 | 170 | 170 | 166 |
| 200 | 200 | 170 | 170 | 170 |

In Table 1-2, which is used in the computation of a gradient feature that corresponds to a horizontal direction (e.g., direction of positive X), a value in cell (x, y) is obtained by subtracting a value in cell (x, y) of Table 1-1 from a value in cell (x+1, y) of Table 1-1. Note that the x-coordinate increases from left to right, and the y-coordinate increases from top to bottom herein.

TABLE 1-2

| 1 | −31 | 0 | 1 |
|---|---|---|---|
| −1 | −29 | 0 | 1 |
| 0 | −30 | −2 | 2 |
| −3 | −27 | 0 | −4 |
| 0 | −30 | 0 | 0 |

According to Table 1-2, a sum of positive changes in pixel data is $Sp=1+1+1+2=5$, and a sum of negative changes in pixel data is $Sn=31+1+29+30+2\ 3+27+4+30=157$. The sum of positive changes is smaller than the sum of negative changes, and is thus selected to serve as the gradient feature corresponding to the horizontal direction (referred to as horizontal feature hereinafter).

In Table 1-3, which is used in the computation of a gradient feature that corresponds to a vertical direction (e.g., direction of positive Y), a value in cell (x, y) is obtained by subtracting a value in cell (x, y+1) of Table 1-1 from a value in cell (x, y) of Table 1-1.

TABLE 1-3

| 0 | 2 | 0 | 0 | 0 |
|---|---|---|---|---|
| 0 | −1 | 0 | 2 | 1 |
| 0 | 3 | 0 | −2 | 4 |
| 0 | −3 | 0 | 0 | −4 |

According to Table 1-3, a sum of positive changes in pixel data is $Sp=2+2+1+3+4=12$, and a sum of negative changes in pixel data is $Sn=1+2+3+4=10$. The sum of negative changes is smaller than the sum of positive changes, and is thus selected to serve as the gradient feature corresponding to the vertical direction (referred to as vertical feature hereinafter).

In Table 1-4, which is used in the computation of a gradient feature that corresponds to a positive diagonal direction, a value in cell (x, y) is obtained by subtracting a value in cell (x, y+1) of Table 1-1 from a value in cell (x+1, y) of Table 1-1.

TABLE 1-4

| 1 | −29 | 0 | 1 |
|---|---|---|---|
| −1 | −30 | 0 | 3 |
| 0 | −27 | −2 | 0 |
| −3 | −30 | 0 | −4 |

According to Table 1-4, a sum of positive changes in pixel data is $Sp=1+1+3=5$, and a sum of negative changes in pixel data is Sn=29+1+30+27+2+3+30+4=126. The sum of positive changes is smaller than the sum of negative changes, and is thus selected to serve as the gradient feature corresponding to the positive diagonal direction (referred to as positive diagonal feature hereinafter).

In Table 1-5, which is used in the computation of a gradient feature that corresponds to a negative diagonal direction, a value in cell (x, y) is obtained by subtracting a value in cell (x+1, y+1) of Table 1-1 from a value in cell (x, y) of Table 1-1.

TABLE 1-5

| 1 | 31 | 0 | −1 |
|---|----|---|----|
| 0 | 29 | 2 | 0  |
| 3 | 30 | 0 | 2  |
| 0 | 27 | 0 | 0  |

According to Table 1-5, a sum of positive changes in pixel data is Sp=1+31+29+2+3+30+2+27=125, and a sum of negative changes in pixel data is Sn=1. The sum of negative changes is smaller than the sum of positive changes, and is thus selected to serve as the gradient feature corresponding to the negative diagonal direction (referred to as negative diagonal feature hereinafter).

The four gradient features are classified into two orthogonal feature groups. The first orthogonal feature group is composed of the horizontal feature and the vertical feature since the horizontal direction and the vertical direction are orthogonal to each other. The second orthogonal feature group is composed of the positive diagonal feature and the negative diagonal feature since the positive diagonal direction and the negative diagonal direction are orthogonal to each other.

In the first orthogonal group, the vertical feature (=10) is greater than the horizontal feature (=5), and is thus selected to serve as the representative gradient feature for the first orthogonal group. In the second orthogonal group, the positive diagonal feature (=5) is greater than the negative diagonal feature (=1), and is thus selected to serve as the representative gradient feature for the second orthogonal group.

Since the representative gradient feature of the second orthogonal group is smaller than the representative gradient feature of the first orthogonal group, the processor determines that the representative gradient feature of the second orthogonal group (=5) is to serve as the monotonicity index that represents monotonicity of the target pixel.

Table 2 provides a second example that exemplarily lists pixel data of 5×5 pixels of a target area (i.e., the target area is an area of 5×5 pixels) with respect to a target pixel (e.g., a central pixel in the target area). The pixel data are arranged according to the locations of the pixels in the reference image. In this example, N is exemplified as two, so four gradient features would be computed.

TABLE 2

| 200 | 201 | 0 | 170 | 171 |
|-----|-----|---|-----|-----|
| 200 | 199 | 0 | 170 | 171 |
| 200 | 200 | 0 | 168 | 170 |
| 200 | 197 | 0 | 170 | 166 |
| 200 | 200 | 0 | 170 | 170 |

In a similar manner as introduced in the first example, the horizontal feature, the vertical feature, the positive diagonal feature and the negative diagonal feature of the second example can be calculated to be 853, 10, 683 and 679, respectively. The representative gradient features of the first and second orthogonal groups are 853 and 683, respectively, and the representative gradient feature of the second orthogonal group (=683) is determined to serve as the monotonicity index that represents monotonicity of the target pixel in this example.

Since the monotonicity index obtained in the second example is greater than the monotonicity index obtained in the first example, the target pixel in the second example is more likely to belong to a detail than the target pixel in the first example.

Referring to FIG. 2 again, after the processor determines the monotonicity indices for the pixels of the reference image, the flow goes to step S24. In step S24, the processor performs upsampling on the monotonicity indices determined for the pixels of the reference image (each of the monotonicity indices was determined when the corresponding pixel served as the target pixel) to obtain a plurality of upsampled monotonicity indices corresponding respectively to the pixels of the source image, so the processor can determine, for each of the pixels of the source image, the likelihood level of the pixel belonging to a detail based on the corresponding one of the upsampled monotonicity indices. For instance, if the source image has a resolution of 1920×1080 and the corresponding reference image has a resolution of 640×60, the processor performs up-sampling on the 640×360 monotonicity indices determined for the pixels of the reference image to obtain 1920×1080 upsampled monotonicity indices that respectively correspond to the pixels of the source image. The upsampled monotonicity indices cooperatively form a monotonicity map that corresponds to the source image.

Figure 4:
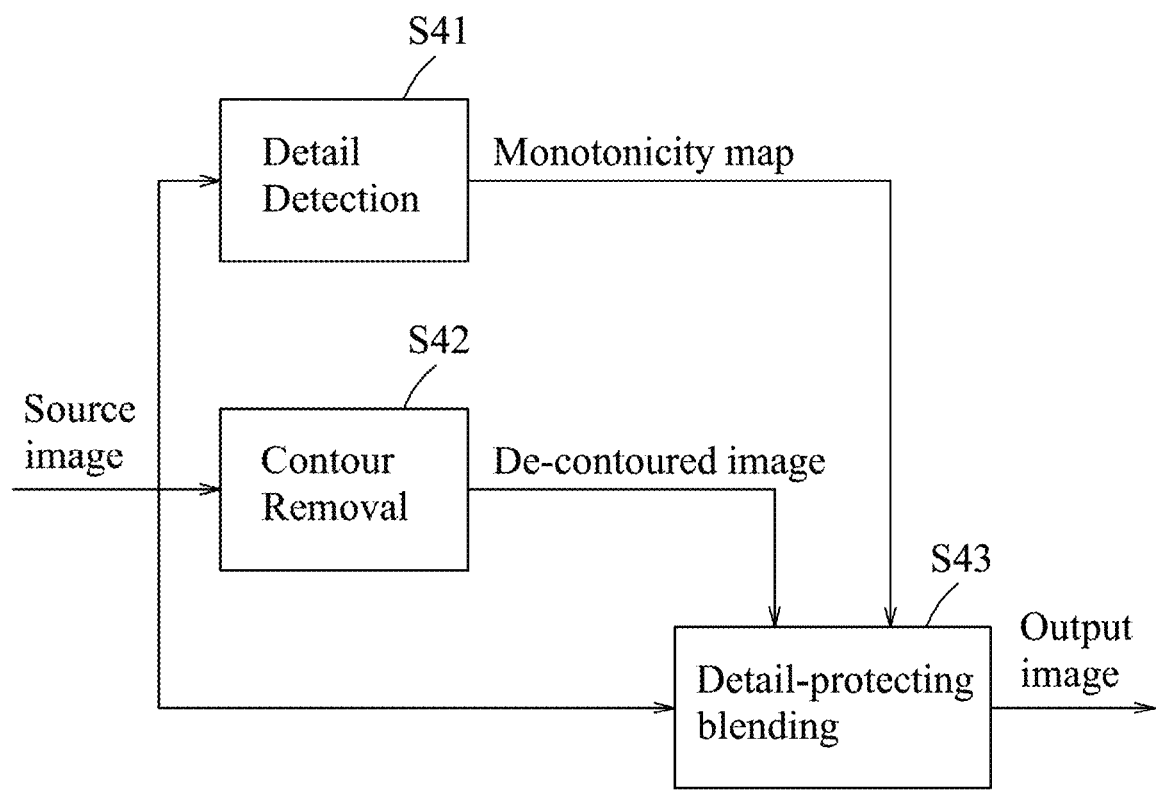
FIG. 4 is a flow chart illustrate steps of a de-contour operation that utilizes the embodiment of this disclosure.

FIG. 4 illustrates a detail-protecting and de-contour operation according to this disclosure. The processor receives a source image, and performs detail detection (step S41) and contour removal (step S42) on the source image. In step S41, the processor performs detail detection on the source image as described in steps S20-S24, and obtains the monotonicity map that corresponds to the source image. In step S42, the processor may use a conventional de-contour technique to perform a de-contour operation on the source image to obtain a de-contoured image that includes a plurality of pixels respectively corresponding to the pixels of the source image. In the de-contoured image, some details (e.g., a large-scale detail such as clouds or smoke) in the image content of the source image may be missing, and some unwanted contours (e.g., noisy contours) in the image content of the source image may still be present. In step S43, the processor performs detail-protecting blending based on the source image, the de-contoured image and the monotonicity map, thereby generating an output image including a plurality of pixels that respectively correspond to the pixels of the source image and that respectively correspond to the pixels of the de-countoured image. In the output image, details in the image content of the source image are preserved and unwanted contours in the image content of the source image are removed. It is noted that the source image, the monotonicity map, the de-contoured image and the output image have the same resolution. In one implementation, in step S43, for each of the pixels of the output image, the processor may perform interpolation using the pixel data of the corresponding pixel of the source image, the pixel data of the corresponding pixel of the de-contoured image to be the pixel data of the pixel of the output image, and the monotonicity map, so as to obtain pixel data of the pixel of the output image. As an example, the pixel data of a pixel of the output image may be obtained according to:

$$P_o[(L_{upper}-I_m) \times P_d + I_m \times P_s]/L_{upper}$$

where $P_o$ represents the pixel data of the pixel of the output image, $P_d$ represents the pixel data of the corresponding one of the pixels of the de-contoured image, $P_s$ represents the pixel data of the corresponding one of the pixels of the source image, $I_m$ represents the upsampled monotonicity index that corresponds to the corresponding one of the pixels of the source image, and $L_{upper}$ is a predetermined constant serving as an upper limit for the upsampled monotonicity indices. When $I_m > L_{upper}$, $P_o$ is calculated by making $I_m$ serve as $L_{upper}$. In one example, $L_{upper}$ may be set as 255. The interpolation operation may make the color gradient in the output image smooth.

Figure 5:
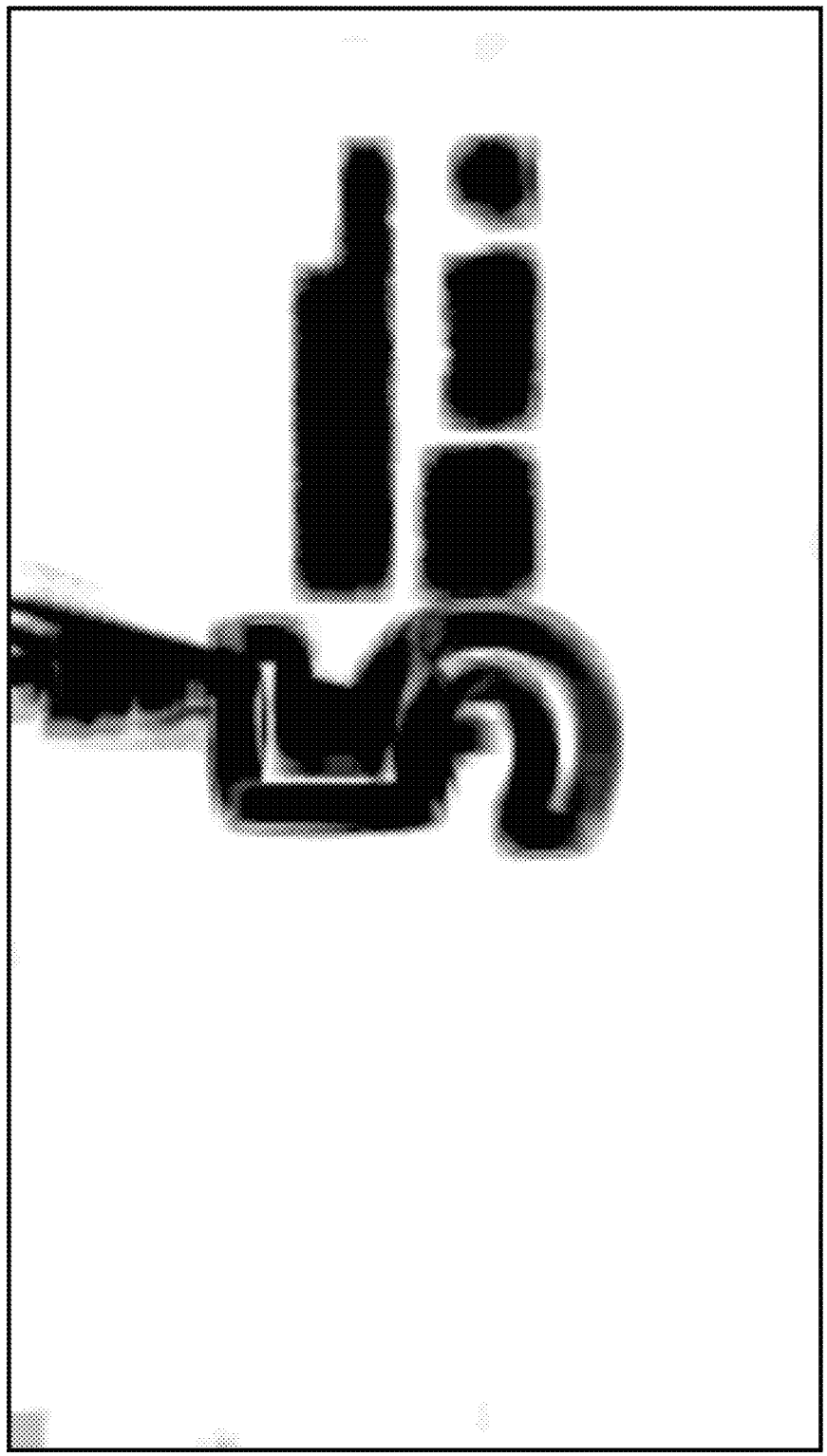
FIG. 5 is an image showing a monotonicity map that is obtained by performing the embodiment according to this disclosure on the image depicted in FIG. 1.

FIG. 5 shows a monotonicity map that is obtained by performing the embodiment according to this disclosure on a source image as shown in FIG. 1. The whiter color represents the higher likelihood level of the pixel belonging to a detail, and the darker color represents the higher likelihood level of the pixel belonging to unwanted contours.

Figure 6:
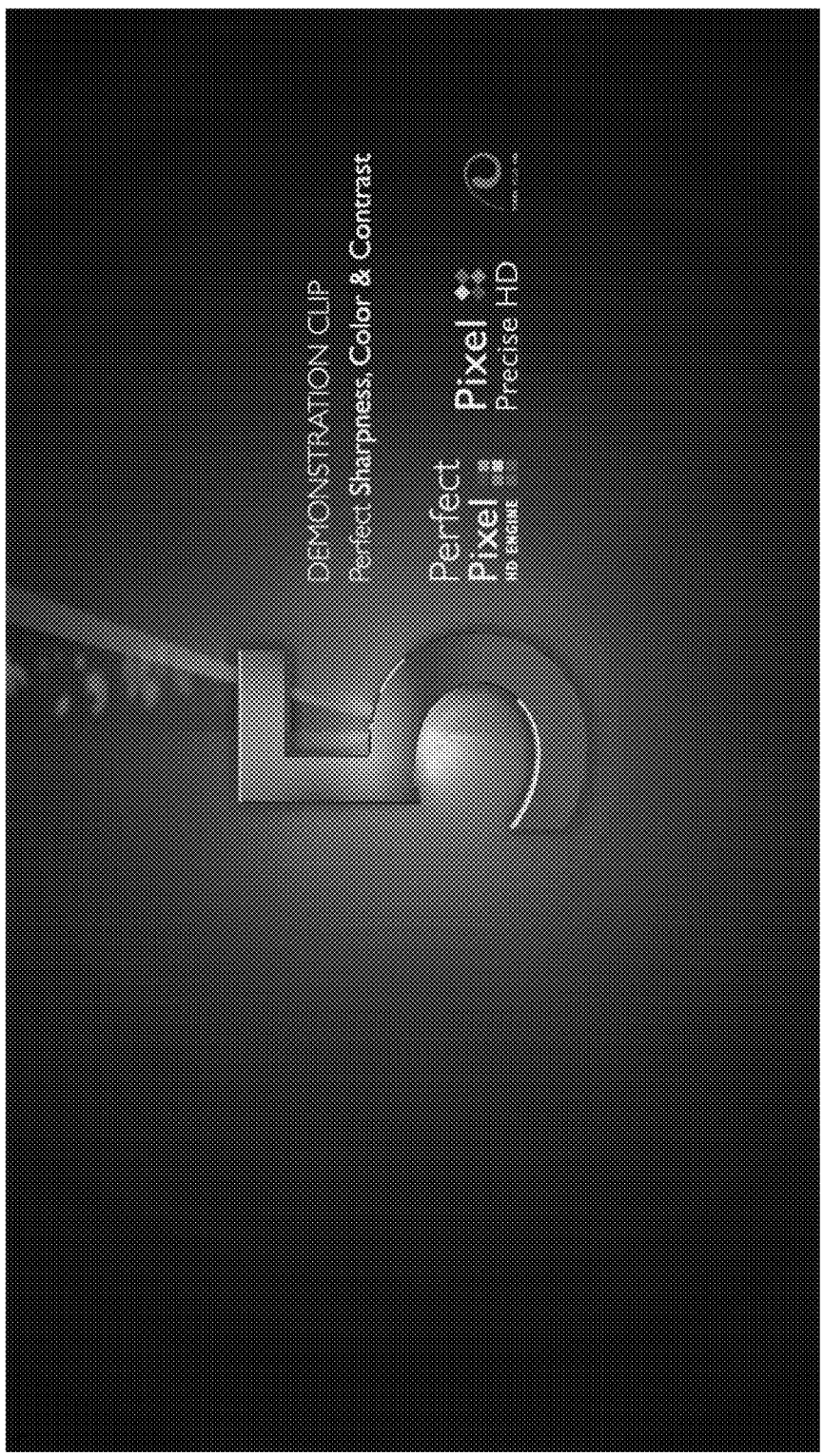
FIG. 6 is an image that shows an output image that is obtained by performing detail-protecting and de-contour operation on the image depicted in FIG. 1 according to this disclosure.

FIG. 6 shows an output image that is obtained by performing the de-contour operation with detail protection according to this disclosure on the source image as shown in FIG. 1. It can be seen that the unwanted contours that exist in the regions with unsmooth color transitions in FIG. 1 have been removed, and the color changes in those regions become smoother in FIG. 6.

In summary, monotonicity analysis that involves multi-oriented gradient calculations in the embodiment according to this disclosure determines the likelihood levels of the pixels being details in an image, which enables the detail-protecting and de-contour operation. The downsampling operation before the monotonicity analysis is helpful in avoiding misjudgment of large-scale details and noisy contours. The upsampling after the monotonicity analysis is performed to obtain the monotonicity map which has the same resolution as the source image.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for de-contouring a source image, comprising:
    obtaining a reference image based on the source image, the reference image including a plurality of pixels that form a same image content as the source image;
    making each of the pixels of the reference image take turns in serving as a target pixel, and computing, for the target pixel, a number 2N of gradient features for a corresponding target area, which contains the target pixel, of the reference image, wherein: N is a positive integer greater than one; the gradient features respectively correspond to a number 2N of directions, and are classified into a number N of orthogonal feature groups each including two of the gradient features in such a way that, for each of the orthogonal feature groups, the directions that respectively correspond to the two gradient features of the orthogonal feature group are orthogonal to each other; and each of the gradient features is related to changes in the corresponding one of the directions in pixel data of those of the pixels located within the target area;
    determining a monotonicity index for the target pixel based on comparison between the two gradient features of each of the orthogonal feature groups; and
    performing a detail-protecting and de-contour operation on the source image based on the monotonicity indices determined for the pixels of the reference image.

2. The method of claim 1, wherein each of the gradient features is computed by:
    computing a sum of positive changes in the corresponding one of the directions in pixel data of those of the pixels located within the target area;
    computing a sum of negative changes in the corresponding one of the directions in pixel data of those of the pixels located within the target area; and
    selecting a smaller one of the sum of positive changes and the sum of negative changes to serve as the gradient feature.

3. The method of claim 2, wherein the determining a monotonicity index for the target pixel includes:
    for each of the orthogonal feature groups, selecting a greater one of the two gradient features in the orthogonal feature group to serve as a representative gradient feature for the orthogonal feature group; and
    determining the monotonicity index for the target pixel based on the representative gradient features of the orthogonal feature groups.

4. The method of claim 3, wherein the monotonicity index for the target pixel is determined to be a smallest one of the representative gradient features of the orthogonal feature groups.

5. The method of claim 1, wherein obtaining the reference image includes: performing downsampling on the source image to obtain the reference image.

6. The method of claim 5, wherein performing the detail-protecting and de-contour operation on the source image includes:
    performing upsampling on the monotonicity indices determined for the pixels of the reference image to obtain a plurality of upsampled monotonicity indices corresponding to pixels of the source image, respectively;
    perform a de-contour operation on the source image to obtain a de-contoured image that includes a plurality of pixels respectively corresponding to the pixels of the source image; and performing detail-protecting blending based on the source image, the de-contoured image and the upsampled monotonicity indices, so as to generate an output image including a plurality of pixels that respectively correspond to the pixels of the source image, and that respectively correspond to the pixels of the de-contoured image.

7. The method of claim 6, wherein, for each of the pixels of the output image, detail-protecting blending is performed according to:

$$P_o = [(L_{upper} - I_m) \times P_d + I_m \times P_s] / L_{upper}$$

where $P_o$ represents pixel data of one of the pixels of the output image, $P_d$ represents pixel data of the corresponding one of the pixels of the de-contoured image, $P_s$ represents pixel data of the corresponding one of the pixels of the source image, $I_m$ represents the upsampled monotonicity index that corresponds to the corresponding one of the pixels of the source image, and $L_{upper}$ is a predetermined constant.

* * * * *